July 12, 1955      E. E. FRANZ      2,712,916
CABLE FANNING STRIP
Filed May 31, 1951      2 Sheets-Sheet 2
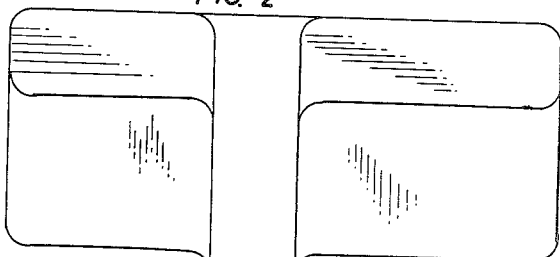
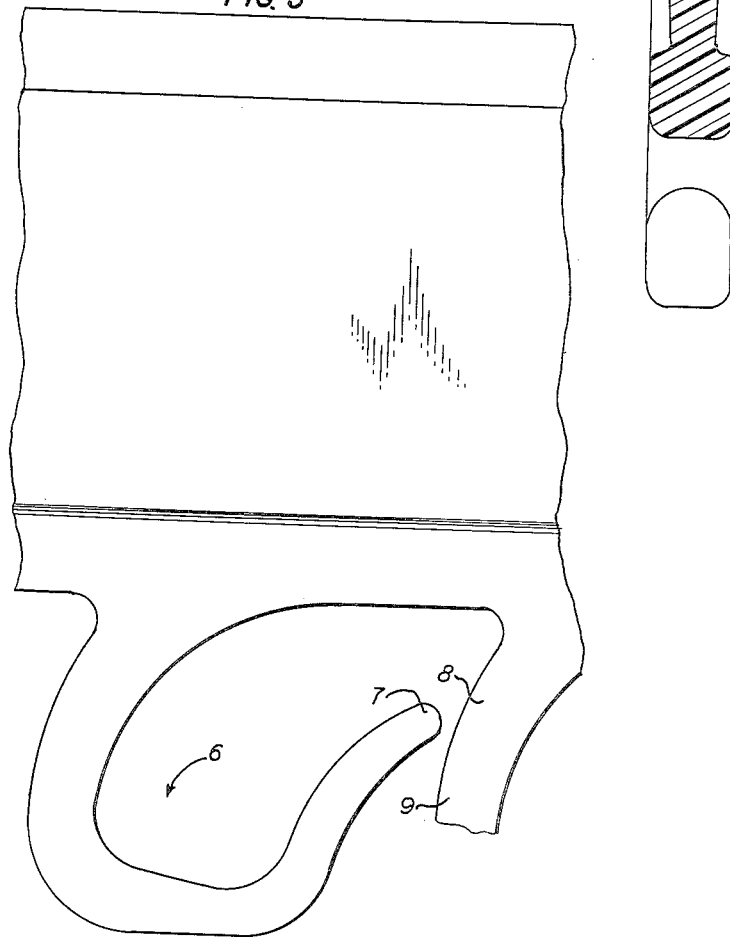
INVENTOR
ERWIN E. FRANZ
BY
ATTORNEY

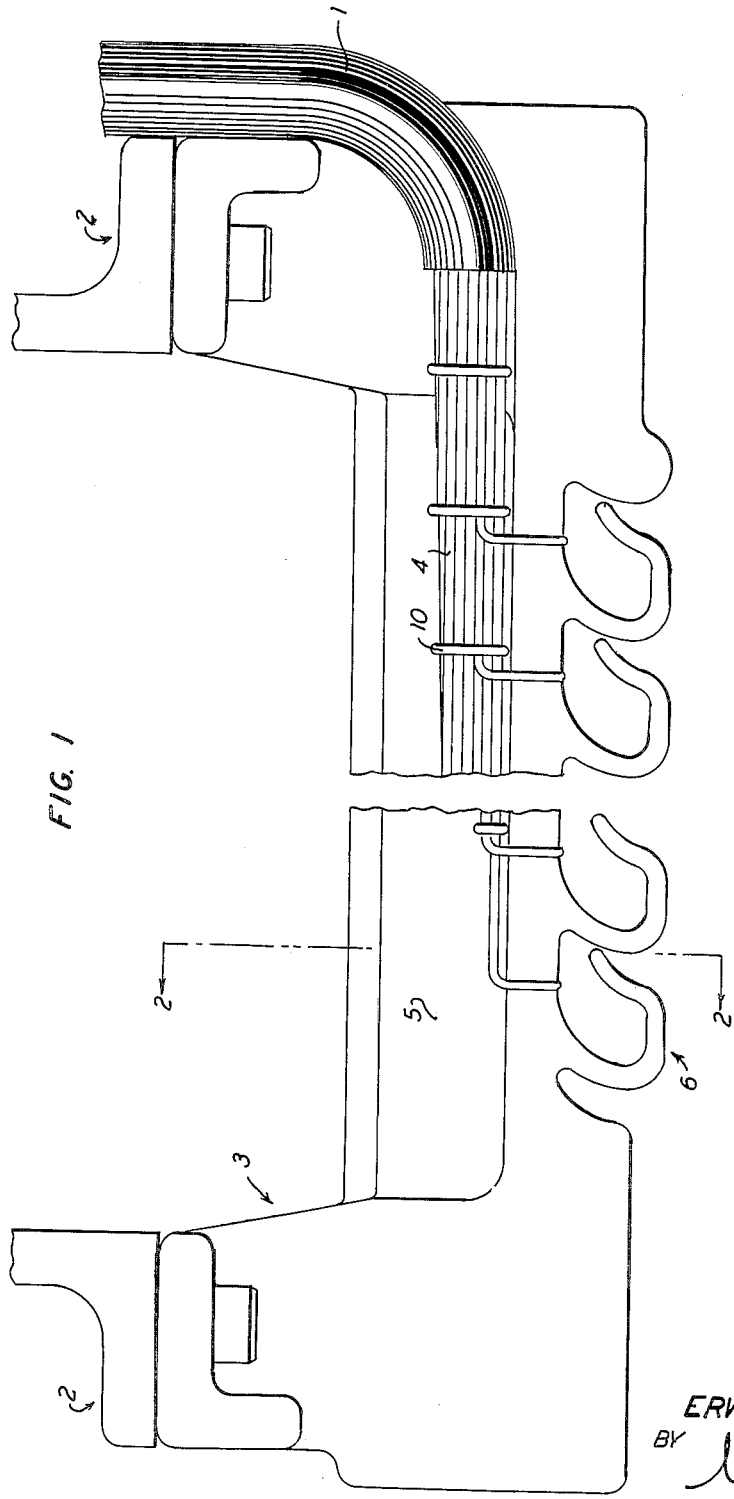

2,712,916

CABLE FANNING STRIP

Erwin E. Franz, Cranford, N. J., assignor to Western Electric Company, Incorporated, New York, N. Y., a corporation of New York Application May 31, 1951, Serial No. 229,057

1 Claim. (Cl. 248—68)

This invention relates to the distribution of cable conductors and more particularly to a device which enables the individual wires of the cable to be distributed quickly and positively in any desired spacing.

In the distribution of the individual wires of a cable, such as in connection with the wiring of telephone switchboards, it is customary to use a fanning strip to facilitate the feeding of the wires into their respective locations. It is necessary that such a strip be of a construction that will prevent the displacement of the fanned wires from their proper locations once they have been positioned and that will also be able to withstand the rough usage to which devices of this type are often subjected. It is therefore an object of this invention to provide a strip which will meet both of these requirements.

Applicant accomplishes this object according to the invention by forming on a plastic strip a plurality of longitudinally aligned projections. These projections are hook-shaped and are designed to have a back portion of each hook inclined with respect to the end of the adjacent hook. This sloping of the back portions provides a clearance when the end is pressed inwardly which increases more than the distance the end is moved, and also provides a support for the end when it is pressed outwardly.

Other objects and advantages will be apparent from the following detailed specification taken in conjunction with the attached drawings in which:

Fig. 1 is a front elevational view of the cable fanning strip;

Fig. 2 is a side view of the strip; and

Fig. 3 is an enlarged view of the projections of the strip.

With reference to the drawings a cable whose wires are to be distributed is designated as 1, with the distribution being made to a telephone switchboard or to other types of electrical panels. The cable 1 which is to be distributed may be brought in at either end 2 of a cable fanning strip generally designated as 3. The cable may be fastened in any suitable manner at the end in which it is introduced to the strip, with an unsheathed portion 4 of the cable being passed along the longitudinal main part 5 of the cable fanning strip.

The strip 3, which may be of any suitable flexible insulating material, as for example "Tenite," has a plurality of projections 6 formed on the underside of its main longitudinal part 5. These projections may be given any desired spacing to conform to the locations at which leads are to be taken from the main body 4 of the cable and guided to their proper positions on the panel board with which the strip is to be used; however, in most cases these projections would be spaced at an equal distance from each other as shown in Fig. 1. Bindings 10, as shown in Fig. 1, are provided at each point at which leads are to be taken off to preserve the compactness of the cable.

The projections 6 are hook-shaped, with each projection including a tip 7 and back portions 8 and 9. It is necessary that the leads which are taken from the main body of the cable and passed to the panel board through the various hook-like projections be prevented from shifting position from their required location by coming out of the hook formed by the projection once they have been positioned within. To this end the successive projections are spaced close to each other and the back portion 8 of each hook is inclined away from the adjacent tip 7 of the projection on its left, looking at Fig. 1. The normal opening or clearance between the tip 7 and its adjacent surface 8 is caused to be less than the diameter of the individual conductors which are to be passed through this opening so that wires once passing through will remain inside the hook and will not be able to get out. The projections 6 are relatively resilient and since the tips 7 are not fixed in position, pressure of the wires as they are passed through the normal opening into the inner part of the hook causes the tips 7 to move upwardly a distance sufficient to allow the wires to pass therethrough. By shaping the back portions 8 of the projections above the opening so as to make them recede from their associated tips 7, the distance between the tip and its corresponding surface 8 as a wire is being passed through the opening will increase faster than the actual distance that the tip is moved because of the recedence of the slope of the surface 8 with respect to the direction of movement of the tip. This feature of the invention greatly reduces the distortion needed to pass wires through the opening into the interior of the hook. After the wires have been fanned out through the various hook-shaped projections, they are usually pulled down against the inside of the tip portion of the hook preparatory to removing or skinning the insulation from the end of the wire. Pulling down the tip portions of the projections in this manner places a strain on the hook which may be sufficient to bend or break it. To overcome this problem, the portions 9 of the hook body below the normal opening are sloped toward the projection tip on its left so that the tip will strike this surface before it has been bent too far downwardly, thereby using the surface 9 as an anchor and preventing damage to the projection. This limitation on the downward movement of the tip has been found very useful in prolonging the life of the fanning strip.

By means of a cable fanning strip as described above, it is possible to pass leads from a cable to a panel board through the strip projections in a quick and convenient manner with the leads being positively prevented from being disengaged from the projections holding them in place. Also, since the hook portions are widely used for wire insulation stripping purposes, the shaping of the main body of the projections to afford support for its adjacent tip on this operation greatly reduces the strain on the projections and results in longer life for the strip.

Economy of the molding material from which the strip is formed may be accomplished by using a relatively flat strip 5 and then adding a slip-on channel shaped metal stiffener to provide the desired rigidity. The use of a flat strip as against a T-shaped one would also simplify the molding problem.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

A device for positioning the wires of a cable comprising a unitary strip having a plurality of substantially U-shaped hooks with like legs thereof integral with and extending from one edge thereof, the legs of the hooks integral with the strip being sufficiently large in cross-sectional dimensions to render them rigid, the other legs of the hooks being sufficiently smaller in cross-sectional dimensions than their companion rigid legs to render them flexible, while the leg connecting portions of the hooks taper from the cross-sectional dimensions of the rigid legs to the cross-sectional dimensions of the flexible legs, each of said connecting portions extending at an angle toward the flexible leg of an adjacent hook, each of said flexible legs curving outwardly toward an adjacent hook and having its free end terminating just short of and inwardly of the rigid leg of the adjacent hook to form a restricted passageway adapted to be opened readily by wires forced into the hook and adapted to be closed readily by wires attempting to escape from the hook forcing the free end of the outwardly curved flexible leg against the rigid leg of the adjacent hook.

References Cited in the file of this patent

UNITED STATES PATENTS

| | | |
|---|---|---|
| 24,677 | Tschus | July 5, 1859 |
| 422,651 | Stanley | Mar. 4, 1890 |
| 436,600 | Hartmen | Sept. 16, 1890 |
| 715,563 | Doublat | Dec. 9, 1902 |
| 835,268 | White | Nov. 6, 1906 |
| 1,161,062 | Mankey | Nov. 23, 1915 |
| 1,258,093 | Corder | Mar. 5, 1918 |
| 1,960,095 | Tonneson | May 22, 1934 |
| 2,082,099 | Cruser | June 1, 1937 |
| 2,157,001 | Morely | May 2, 1939 |
| 2,299,962 | Byrkit | Oct. 27, 1942 |
| 2,304,967 | Tiryakian | Dec. 15, 1942 |
| 2,397,291 | Robertson | Mar. 26, 1946 |
| 2,462,051 | Starr | Feb. 15, 1949 |
| 2,565,440 | Soref et al. | Aug. 21, 1951 |

FOREIGN PATENTS

| | | |
|---|---|---|
| 45,093 | Germany | Oct. 30, 1888 |